United States Patent [19]

Boman

[11] Patent Number: 5,231,628
[45] Date of Patent: Jul. 27, 1993

[54] NETWORK SYSTEM FOR DATA TRANSMISSION

[75] Inventor: Jan Boman, Spanga, Sweden

[73] Assignee: Nokia Data Systems A.B., Kista, Sweden

[21] Appl. No.: 476,683

[22] Filed: Feb. 8, 1990

[30] Foreign Application Priority Data

Feb. 10, 1989 [SE] Sweden ............... 8900465

[51] Int. Cl.⁵ .............................. H04J 3/02
[52] U.S. Cl. ........................ 370/24; 370/29; 370/85.15
[58] Field of Search ............ 370/27, 28, 29, 32.1, 370/24, 30, 31, 85.5, 85.12, 85.15; 375/35, 36; 379/402

[56] References Cited

U.S. PATENT DOCUMENTS

| | | | |
|---|---|---|---|
| 3,689,710 | 9/1972 | Colardelle et al. | 370/28 |
| 3,983,323 | 9/1976 | Griffith et al. | 370/28 |
| 4,670,874 | 6/1987 | Sato et al. | 370/29 |
| 4,686,703 | 8/1987 | Bruno et al. | 370/32.1 |
| 4,712,210 | 12/1987 | Davis et al. | 370/77 |

Primary Examiner—Douglas W. Olms
Assistant Examiner—Melvin Marcelo
Attorney, Agent, or Firm—Larson & Taylor

[57] ABSTRACT

The invention relates to a network system for data transmission between two data processing units, e.g. a peripheral unit (PE) and a Token Ring network with a cable concentrator. Full duplex transmission is effected over each transmission channel between the two data processing units. For this purpose, the transmission channel comprises a two lead connection (KOAX) with an adapter (APE, AMAU) on either side. One of the adapters is coupled to a peripheral unit and the other to the media access unit (MAU). Each adapter has a transmitting file (TS, TS') for receiving data which is to be transmitted on the two lead connection to the other adapter, a receiving file (TM, TM') for transmitting data to its coupled unit after being sent over the two lead connection from the other unit, and a sorting coupling (TB, Rb, 2; TB', Rb', 4) which sorts out the data on the two lead connection which the adapter has not sent out thereon itself, and feeds this data to the receiving file (TM, TM').

18 Claims, 3 Drawing Sheets

NETWORK SYSTEM FOR DATA TRANSMISSION

The present invention relates to a network system of the type described in the preamble to claim 1.

Office data processing systems often involve expensive cable installation between a central computer and a number of terminals, called peripheral units below. Different types of data processing systems require different types of cables. A change in data processing system often requires re-laying the cables with the accompanying cost thereof.

There are star networks, in which all the peripheral units are connected to a central unit by individual cables. If some fault arises in a peripheral unit, the other peripheral units in the system are not affected. Connecting a new peripheral unit is done simply by connecting an additional cable to the central unit.

One disadvantage of this peripheral system is that the flow of data between the various peripheral units is administered by the central unit, which decreases the effectiveness of the system if data is to be sent between the various peripheral units. Another disadvantage is that expansion with numerous peripheral units requires numerous ports in the central unit, making it expensive. Furthermore, there is a limit to what the central unit can administer.

One example of a star network is the IBM 3270 system, which uses an RG 62 coaxial cable between the central unit and the peripheral unit. Transmission is half duplex. The SS 3 network in Alfaskop ® is a star network which normally uses shielded double lead but which can also use RG 62 coaxial cable.

There are series coupled ring networks which have the advantage that the flow of data in the ring passes all the peripheral units without any controlling central unit. The disadvantages are that a series linked ring is difficult to expand or change and it is less reliable. Since all the peripheral units are connected in series in the ring, addition of another peripheral unit requires new cables between the units. Removal of a peripheral unit from the ring is also difficult, since the ring must be broken. Since there is no central point where the cables converge, problems can spread throughout the entire ring. A simple two conductor cable or a coaxial cable can be used, since the flow of data is always in the same direction in the ring, i.e. the transmission is simplex.

There are also star linked ring networks, which retain the advantage of series link data flow between the peripheral units but avoid some of the disadvantages of the series linked network.

In a star linked network, there is a cable for each peripheral unit to a central point, where a so-called cable concentrator is located. The cable concentrator contains only media access units with relays and relay contacts with a relay for each cable. The relay can connect the cable to the ring on order from the peripheral unit and if a fault arises it can disconnect the cable from the ring. If the cable is connected, it is thus a portion of the ring, and this requires a cable with two pairs of conductors. The transmission through the cable is full duplex. When the cable is disconnected, the ring is rerouted internally in the cable concentrator.

One example of this type of network is the so-called Token Ring, which uses a shielded twin lead between the cable concentrator and the peripheral units.

If a user, who presently has a star network installed, for example a 3270 system, wishes to install a Token Ring system, all of the cables must be replaced with a twin cable, e.g. of IBM type. This is often quite expensive and time consuming, especially in buildings not provided with space for cables.

If it were possible to use the existing cables, this would be a great advantage. Since the Token Ring system operates at a transmission speed of 4 Mbits/second or 16 Mbits/second, this requires a coaxial cable, at least for longer distances.

The invention is intended to provide a system where existing installed cables for a star network, e.g. shielded twin lead cable or coaxial cable with single conductors, can be used in installing a data processing system requiring a cable with at least two pairs of leads.

The abovementioned purpose is achieved according to the invention with an arrangement having the characteristics disclosed in claim 1. Further features and developments are disclosed in the subclaims.

The invention is, however, applicable to any type of point-to-point connection between two units with base band transmission with continuous data traffic in full duplex in both directions.

The invention will be described in more detail below with reference to the accompanying drawings, where FIG. 1 shows schematically a first embodiment of a data network according to the intention.

Figure 1:
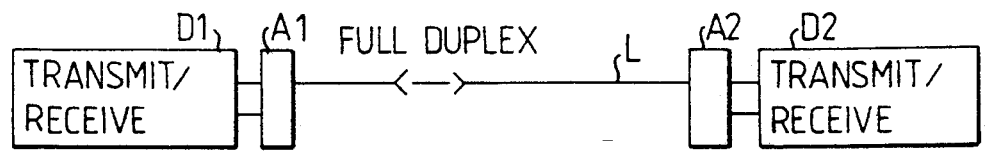
Figure 3A:
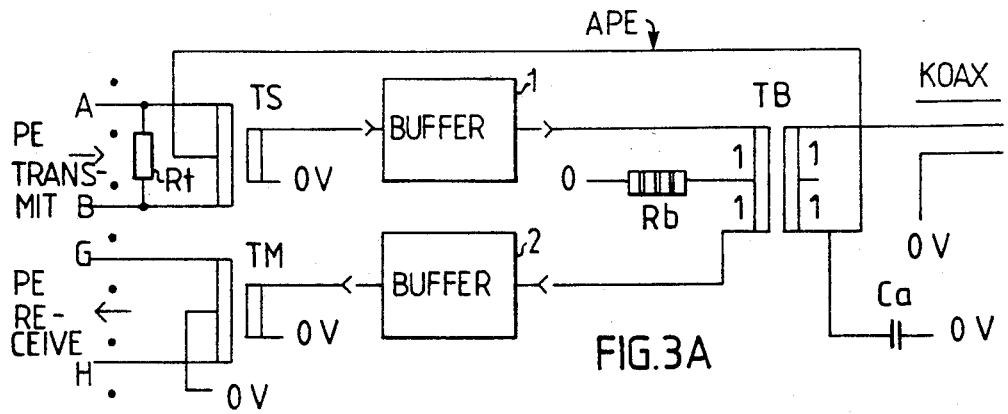
FIGS. 3A–3C show in detail embodiments of various components in the network in FIG. 2.

FIG. 1 shows schematically a general application for network linked with full duplex through a twin lead L. A first computer unit D1 is linked via a first adapter A1 to the twin lead. A second computer unit D2 is linked via a second adapter A2 to the twin lead. Preferably, the two adapters are constructed as shown in FIG. 3A. Both computer units D1 and D2 are transmitting and receiving data through the lead L. In both transmission directions, the signal is a base band signal. The base band signals can be coded identically with the same number of bits per second, but this is not entirely necessary.

Figure 2:
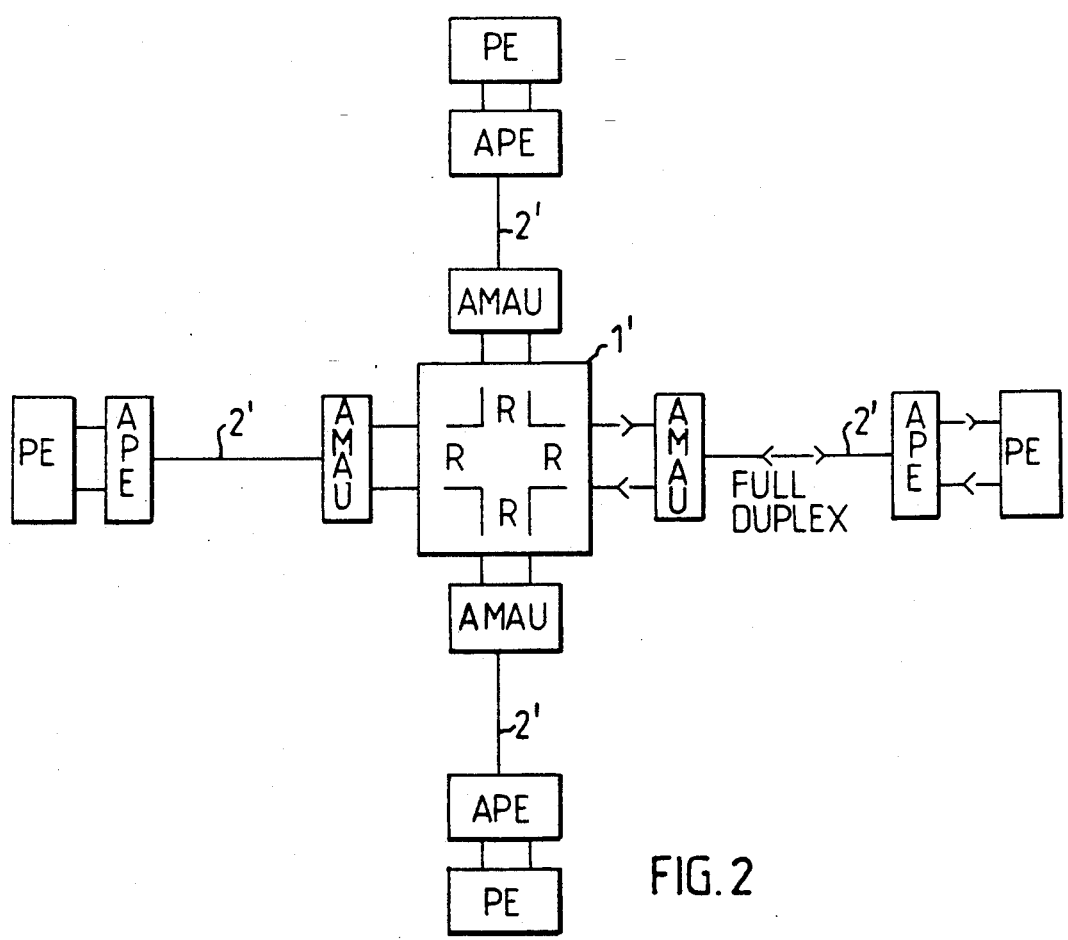
FIG. 2 shows schematically a second embodiment of a data network according to the invention.

In the very schematically shown embodiment of a network configuration according to the invention shown in FIG. 2, a central cable concentrator 1' comprises a ring network with an outlet with a media access unit (MAU) comprising a relay R for each peripheral unit PE linked to the system. A more detailed description of a media access unit will be provided below. According to the invention, the twin pair cable normally used in such Token Ring systems is replaced by a twin lead cable or more suitably a single wire coaxial cable 2, e.g. RG 62, which cable is connected at its both ends to adapters APE and AMAU, respectively.

The existing coaxial cables are thus utilized. Since the Token Ring system works at a transmission speed of 4 Mbits/second or 16 Mbits/second, for example, a coaxial cable is required at least for longer distances.

Since the traffic in so-called base band transmission, e.g. with the data traffic coded in so-called Manchester-code (DFM), in the Token Ring between the cable concentrator and the peripheral units goes in both directions simultaneously, i.e. the traffic in the cable is transmitted full duplex, the coaxial connections must be able to handle this. Furthermore, one must transfer the direct current from the peripheral unit PE, which controls the relay R in the cable concentrator.

This can be done by connecting a relatively simple adapter at either end of the coaxial cable. The adapter contains a so-called hybrid coupling, i.e. a coupling which separates the transmission data and the receiving data from each other, and electronic components which transmit the direct current without affecting the data signal.

Each adapter APE, AMAU has a transmission buffer, a receiver buffer and a transmission bridge, which prevents the transmission signal from the adapter from affecting its own receiver.

The adapter card APE (FIG. 3A) is connected at the end facing the peripheral unit PE to the interface which normally feeds a quadruple lead cable, bodes A, B, G, and H. TS and TM are transformers with a transformation ratio which can be 2:1, one for sending and one for receiving. A driving voltage of 5 V is often available from an outlet on the peripheral unit PE and this can then be used to drive units in the adapter, such as amplifiers. There can also be a certain difference between the driving voltage to a signal transmitting element and the signal level, and therefore it can be suitable to occasionally reduce the signal level inside the adapter APE, which occurs at the transformation ratio 2:1. If higher driving voltage is available, the ratios of the transformers TS and TM can be different, e.g. 1:1. The series data signal is transmitted with so-called differential Manchester-code (DFM), which means that the signal has no direct current component, and thus the signal can be transmitted via the transformers without distortion. The transmitter of the peripheral unit sends out the signal in the form of a square wave with a voltage range of ±1.85 V between the nodes A and B. The signal is fed from the adapter APE via the coaxial cable KOAX to the adapter AMAU (FIG. 3B) and reaches the media access unit MAU (FIG. 3C) at nodes C and D and is transmitted via the transformer TR1 in the media access unit MAU to the ring. The transformer TR1 is coupled to the ring by relay contacts RS1 and RS3 in a manner which will be described in more detail below.

The signal comes from the ring via relay contacts RM1 and RM3 to a transformer TR2 in the media access unit MAU, which transformer feeds the signal to the nodes E and F on the receiving pair of leads. When the signal reaches, thereafter, the peripheral unit PE at the nodes G and H, it is attenuated. The attenuation is dependent on the total cable length from the preceding transmitter which is coupled into the ring.

In the adapter APE (FIG. 3A) a low-ohmic resistance Rt is coupled to load the transmitter outlet from the peripheral unit PE with a load which is equivalent to the normally connected pair of leads. The normal line impedance for IBM's Token Ring is 150 ohm, and for such a use range the Rt' is suitably 150 ohm. The two buffers 1 and 2 are amplifiers with the voltage amplification 1. The inputs are high-ohmic and the outputs are low-ohmic.

TB is a balancing transformer with a ratio 1:1 and a central outlet on the primary side. One end of the secondary side is decoupled to 0 V via a capacitor Ca. The other end feeds the coaxial cable KOAX.

A central outlet on the transmitter transformer TS is coupled to the signally decoupled end of the secondary side of the balancing transformer TB.

What is essential with the buffers 1 and 2 in this context is that the buffer 1 has an outlet which is as low-ohmic as possible in order to load the inlet side of the balancing transformer TB as much as possible and that the buffer 2 has an outlet which is as high-ohmic as possible to load the outlet side for signals as little as possible. The properties of the buffers 1 and 2 at the end which faces the peripheral unit PE are of less importance and can therefore be selected more freely.

The adapter AMAU at the concentrator has an analogous construction to the adapter APE.

The adapter card AMAU (FIG. 3B) is connected at the MAU end to the interface, which normally feeds the four lead cable with nodes C, D, E, and F. TS' and TM' are transformers with a ratio of 2:1, one for transmitting and one for receiving. A low-ohmic resistance Rt' of for example 150 ohms loads the receiving signal from the media access unit MAU with a load which is equivalent to the normally connected pair of leads.

The two buffers 3 and 4 are amplifiers with voltage amplification 1. The inlets are high-ohmic and the outlets are low-ohmic. The same discussion as above regarding the input-output ohmic state of the buffers 1 and 2 is due also for the buffers 3 and 4, since the adapters APE and AMAU shown in FIGS. 3A and 3B have the same design.

TB' is a balancing transformer with ratio 1:1 and with a central outlet on the primary side (facing the MAU). One end of the secondary side is decoupled to 0 V via a capacitor Ca'. The other end feeds the coaxial cable KOAX.

The signal decoupled side of the balancing transformer TB' is coupled to the central outlet of the transmitter transformer TS'. The central lead of the coaxial cable KOAX, which is connected to the secondary windings of the balancing transformers TB, TB', will have a direct current potential which is determined by the control logic in the peripheral unit PE, which is, for example, a personal computer (PC).

The direct current to the relay unit R flows from the peripheral unit's PE control logic to the central outlet of the transmitting transformer TS in the adapter APE on the primary side, and then flows through the secondary winding of the balancing transformer TB out to the central conductor of the coaxial cable KOAX.

In the adapter AMAU on the cable concentrator side, direct current flows from the cable KOAX through the winding on the cable side in the balancing transformer TB', to the central outlet on the secondary side of the transmitting transformer TS' and out to the relay coil or coils of the relay unit R in the MAU via nodes C and D. The relay unit R includes at least one relay having contacts connected to connect and disconnect the peripheral unit PE to the ring as will be described below.

Figure 3B:
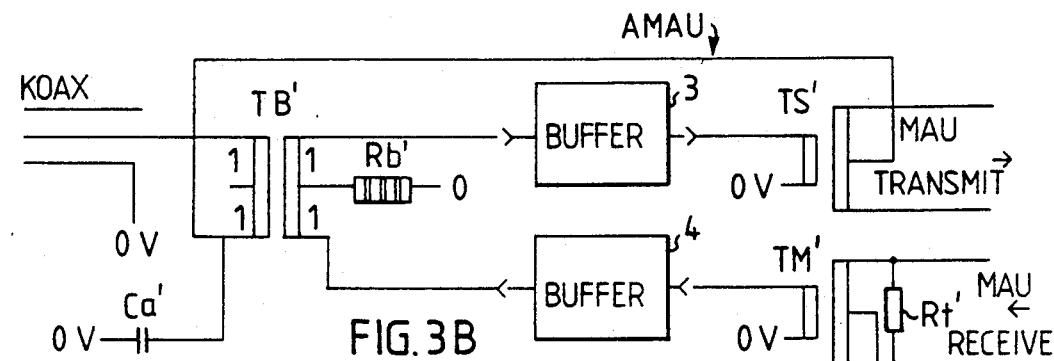

The return current from the relay unit is transferred to the receiver transformer TM' of the adapter AMAU at nodes E and F and is returned to potential 0 V at the central outlet of the transformer TM' on the cable concentrator side. In FIG. 3B, this is made via a saturated transistor 5. The return current then flows via the coaxial cable shield back to the adapter APE of the peripheral unit PE and via the central outlet of its receiver transformer TM to a transformer in PE, nodes G and H. The central outlet in the transformer of the peripheral unit PE returns the current to 0 V.

The units at the concentrator preferably have a common driving voltage supply of voltage V. If the drive voltage V should be absent, the driving of the relay unit R should also cease. Therefore, in the return to the potential 0 V at the central outlet of the transformer TM', a switch coupling can be inserted comprising a switch transistor 5 with its collector-emitter portion coupled to the return and its base coupled via a resistance 6 to the voltage V.

The transistor 5 is kept saturated as long as the voltage V exists, but if the voltage V should be removed, the transistor is blocked.

When transmitting data from the peripheral unit PE to the ring, the transmitter in the peripheral unit feeds via the transformer TS the transmitter buffer 1, which drives the balancing transformer TB. The primary side of the transformer TB has a central outlet, which via a resistance Rb is connected to 0 V. The resistance has the value ZO/4, where ZO is the impedance of the coaxial cable KOAX (for example 93 ohm), which is connected via the secondary winding of the transformer TB. The impedance of the coaxial cable KOAX is transmitted by the transformer TB to the upper portion of the primary winding, and since the ratio between the secondary winding and half of the primary winding is 2:1, the impedance ratio will be 4:1. The transmitter buffer 1 thus feeds a load consisting of the over-transformed coaxial impedance (for example 93/4=23.25 ohm) in series with the resistance Rb, which also has the same value (23.35 ohm).

The output voltage from the buffer 1 will thus be divided up into two equal portions, one portion via the resistance Rb and one portion via the upper half of the primary winding of the transformer TB. The lower half of the primary winding receives the same voltage and polarity as the upper half, i.e. the same voltage as via the resistance Rb. Since the resistance and the lower half are connected at one point and have the same voltage, the voltage into the receiver buffer 2 will be 0 V, i.e. the transformer coupling sees to it that the signal emitted is not fed to the receiver.

The voltage out of the coaxial cable KOAX will be twice that via the half primary winding, i.e. equal to the signal from the transmitter buffer 1.

A received signal from the coaxial cable KOAX is fed via the transformer TB to the receiver buffer 2. That portion of the transformer TB which is connected to the transmitter buffer 1, is signal grounded, since the outlet of the transmitter buffer 1 is low-ohmic. The signal into the receiver buffer 2 will be as large as the signal from the coaxial cable KOAX.

The resistance Rb loads the transformer TB at the central outlet, and the impedance seen from the coaxial cable will be Rbx4, which is equal to ZO.

The suppression of one of the transmitted signals to the receiver 1 in the adapter APE is not total, due to tolerances in the resistance Rb, tolerances in ZO in the coaxial cable, contact faults, random capacitances and the fact that the transformer TB is not ideal.

The residual transmitter signal will be added to the signal received from the coaxial cable KOAX, and the receiver in the peripheral unit PE will have this error in the form of a time jitter.

The ratio between the useful signal from the media access unit MAU in the cable concentrator and the error signal will determine how great the jitter will be.

Figure 3C:
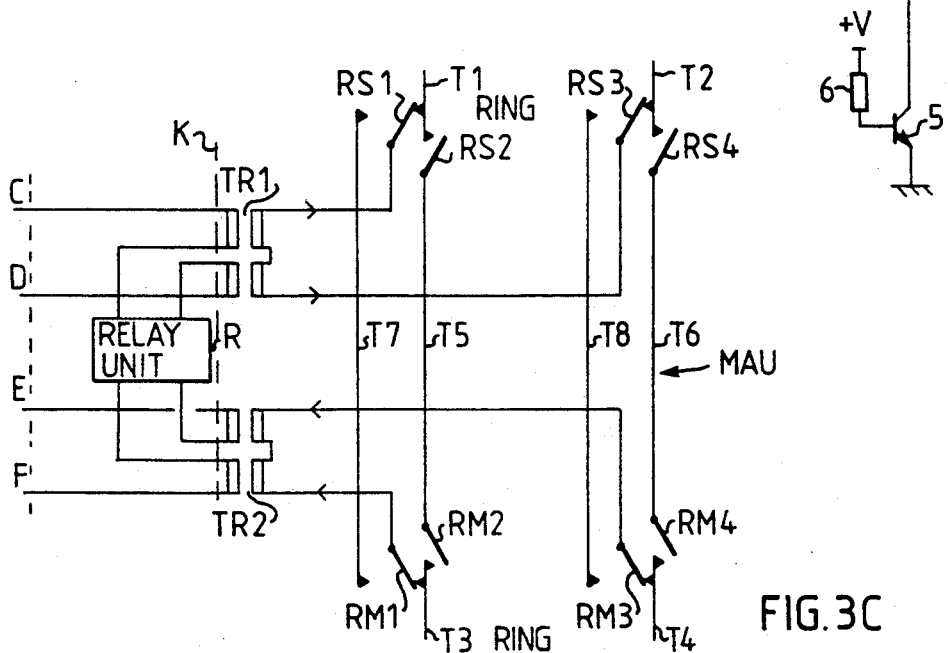

FIG. 3C shows a common form of a media access unit MAU with the relay contacts of the relay unit R and coupled to the ring. The relay unit R has two-way contacts RS1, RS3, RM1, RM3, and break contacts RS2, RS4, RM2, RM4. The FIG. 3C shows the contacts in the position they assume when the peripheral unit PE is coupled into the ring, and thus the relay unit R is activated. Data is then sent from the transmitting leads C and D in the adapter AMAU in the quadruple cable C, D, E, F, via the relay contacts RS1 and RS3, respectively, out to the conductor pair T1, T2, and data from the conductor pair T3, T4 is received by the receiver conductors E and F via the contacts RM1 and RM3, respectively. When the peripheral unit PE disconnects itself from the ring, i.e. its direct current supply to the relay R ceases so that it is inactivated, the relay contacts shown in FIG. 3C are moved to the left. The ring is closed by the conductor T5 being coupled to the conductor T3 via the contact RM2 and to the lead T1 via the contact RS2 and by the fact that the conductor T6 is coupled to the conductor T4 via the contact RM4 and to the conductor T2 via the contact RS4. Preferably, there are thus two contacts on each of the conductors T5 and T6. The secondary side of the transformer TR1 is coupled to the primary side of the transformer TR2 via the two conductors T7 and T8 with contacts RS1, RM1 and RS3, RM3.

Figure 4:
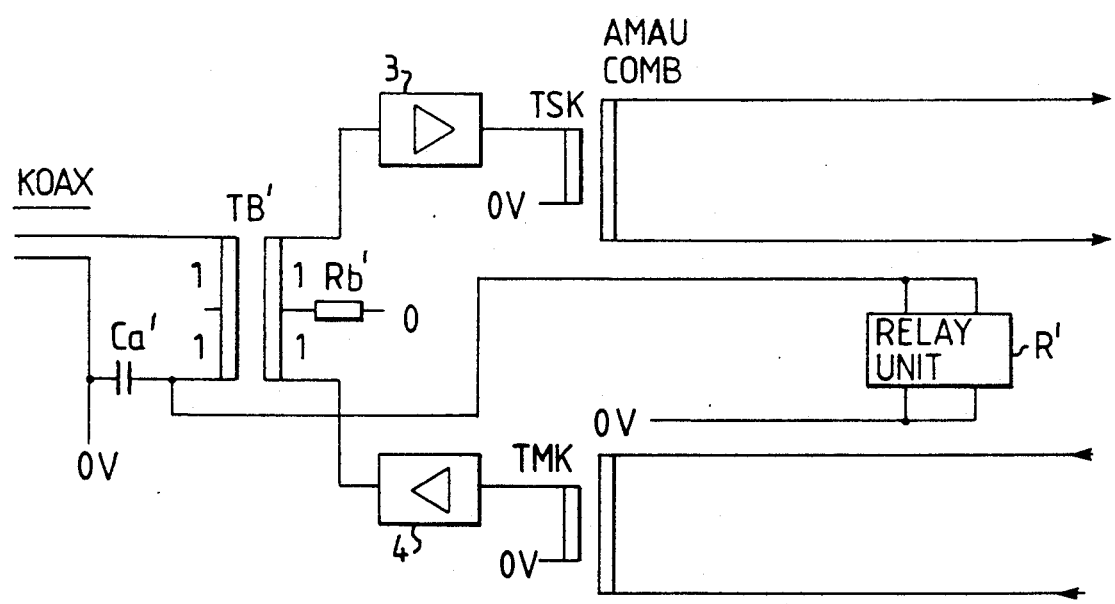
FIG. 4 shows another embodiment to replace a circuit shown in FIG. 3B and partly in FIG. 3C.

As mentioned above, FIG. 3C shows a commercially available media access unit MAU. FIG. 3B thus shows an adapter AMAU, which is adapted to be coupled to this common MAU. FIG. 4 shows a circuit with a combination of an adapter AMAU and the portion of the media access unit MAU in FIG. 3C which lies to the left of the dashed line K.

Components corresponding to those in FIG. 3C have been given the same reference symbols. What distinguishes the circuit in FIG. 4 from the circuit in FIG. 3B together with the left-hand portion of the circuit in FIG. 3C is that the outlet of the buffer 3 is coupled to the primary side of a transformer TSK, the secondary side of which is coupled to the respective contacts RS1 and RS3 in the ring (see FIG. 3C). Furthermore, the inlet to the buffer 4 is coupled to the secondary side of a transformer TMK, the primary side of which is coupled to the respective contacts RM1 and RM3 in the ring. The relay coil or relay coils of the relay unit R', which has contacts RS1, RS2, RS3, RS4 and RM1, RM2, RM3, RM4, is/are coupled between the end of the secondary side of the transformer TB', which end is decoupled to the condensor Ca' and O-potential. The relay unit R' (as well as the unit R in FIG. 3C) controls many contacts and therefore can comprise a plurality of relays, i.e. two. The adapter $AMAU_{COMB}$ in FIG. 4 thus has substantially the same configuration as the adapter AMAU in FIG. 3B except for the relay unit and could be used when there is no standard multi access units already provided with transformers TR1 and TR2 in order to save extra transformers and lead connections. Thus in this case, the multi access unit lacks the part on the left of the dashed line K.

The concept of the invention is also very applicable to transmission over a certain distance with time multiplexing at both ends, for example. One advantage of the invention is that for transmittion via the cable, it is not necessary to coordinate the time multiplexing units on either side of the cable with each other. Transmission and reception of data over the two lead connection are not tied to each other.

Figure 5:
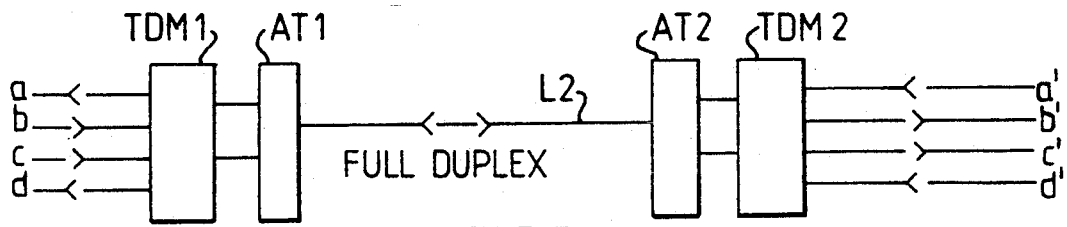
FIG. 5 shows schematically a third embodiment of the data network according to the invention.

FIG. 5 shows an embodiment with digital time division multiplexors TDM1 and TDM2 on either side of a twin lead L2, coupled thereto via an adapter of the type shown in FIG. 3A. Computer units a-d are coupled to the multiplexor TDM1. Computer units a'-d' are coupled to the multiplexor TDM2. The units a and a' communicate by half duplex, as do the units b—b', c—c', d—d'. As shown with the arrows between the units and the multiplexors, the unit a receives at the same time as the unit b transmits and unit c transmits at the same time as unit d receives. Thus, signals at the four connections with time multiplex can be transferred with base band transmission to a connection working with full duplex.

While the invention has been illustrated and described above in connection with certain embodiments thereof, it should be understood that a number of changes, modifications and substitutions therein will readily occur to one skilled in the art without departing from the scope and spirit of the invention.

I claim:

1. A network system for data transmission between at least two units with base enabling full and mutually independent baseband duplex transmission over a transmission channel, wherein the transmission channel comprises:
   a two lead connection;
   an adapter on either side of said two lead connection, each adapter being coupled to one of said units and comprising
   (a) a transmitting means for receiving data which is to be transmitted out to said two lead connection to said other adapter,
   (b) a receiving means for transmitting data sent from the other unit via said two lead connection to the unit to which said receiving means is coupled, and
   (c) sorting means for sorting out the data from said two lead connection which said adapter does not itself send thereon, and feeding this data to said receiving means.

2. A network system according to claim 1, wherein in each adapter said sorting means comprises a transmission bridge with a balancing transformer having its primary side divided into two identical portions, one of these portions being coupled to said transmission means and the other to said receiving means and a central outlet on the primary side coupled via a resistance to ground.

3. A network system according to claim 2, wherein to said portion of the balancing transformer primary side, which is coupled to the transmitting means, there is coupled the outlet of a first buffer circuit having a low-ohmic outlet, and to said portion of the balancing transformer primary side, which is coupled to the receiving means, there is coupled the inlet of a second buffer circuit having a high-ohmic inlet.

4. A network system according to claim 1, wherein one of said units is coupled as a portion of a ring network.

5. A network system according to claim 4, wherein the ring network is in the form of a cable concentrator with a relay arrangement for each connection with a peripheral unit, which relay unit, as controlled from the peripheral unit, switches the relay arrangement on or off by sending a direct current signal through a coupled direct current path through both of the adapters and the two lead connection to the relay coil.

6. A network system according to claim 1, wherein the two lead connection comprises a coaxial cable.

7. A network system according to claim 1, wherein the transmitting means in the adapter comprises a transformer and a buffer connection having a low-ohmic outlet.

8. A network system according to claim 1, wherein the receiving means in the adapter comprises a buffer connection having a high-ohmic inlet and a transformer (TM).

9. A network system according to claim 1, wherein a digital time divider multiplexer is coupled to each adapter on either side of the two lead connection.

10. In a network system comprising a transmission channel and at least first and second transmit-receive units for providing full and mutually independent duplex transmission between said units over said transmission channel, the improvement wherein said transmission channel comprises
    a two lead connection;
    an adapter on either side of said two lead connection, each adapter being coupled to one of said units and comprising
    (a) a transmitting means for receiving data which is to be transmitted out to said two lead connection to said other adapter,
    (b) a receiving means for transmitting data sent from the other unit via said two lead connection to the unit to which said receiving means is coupled, and
    (c) sorting means for sorting out the data from said two lead connection which said adapter does not itself send thereon, and feeding this data to said receiving means.

11. A network system according to claim 10, wherein in each adapter said sorting means comprises a transmission bridge with a balancing transformer having its primary side divided into two identical portions, one of these portions being coupled to said transmission means and the other to said receiving file, and a central outlet on the primary side coupled via a resistance to ground.

12. A network system according to claim 11, wherein to said portion of the balancing transformer primary side, which is coupled to the transmitting means, there is coupled the outlet of a first buffer circuit having a low-ohmic outlet, and to said portion of the balancing transformer primary side, which is coupled to the receiving means, there is coupled the inlet of a second buffer circuit having a high-ohmic inlet.

13. A network system according to claim 10, wherein one of said units is coupled as a portion of a ring network.

14. A network system according to claim 13, wherein the ring network is in the form of a cable concentrator with a relay arrangement for each connection with a peripheral unit, which relay unit, as controlled from the peripheral unit, switches the relay arrangement on or off by sending a direct current signal through a coupled direct current path through both of the adapters and the two lead connection to the relay coil.

15. A network system according to claim 10, wherein the two lead connection comprises a coaxial cable.

16. A network system according to claim 10, wherein the transmitting means in the adapter comprises a transformer and a buffer connection having a low-ohmic outlet.

17. A network system according to claim 10, wherein the receiving means in the adapter comprises a buffer connection having a high-ohmic inlet and a transformer.

18. A network system according to claim 10, wherein a digital time divider multiplexer is coupled to each adapter on either side of the two lead connection.

* * * * *